C. S. JACOB.
VEHICLE.
APPLICATION FILED DEC. 30, 1918.
1,297,856.
Patented Mar. 18, 1919.
2 SHEETS—SHEET 2.
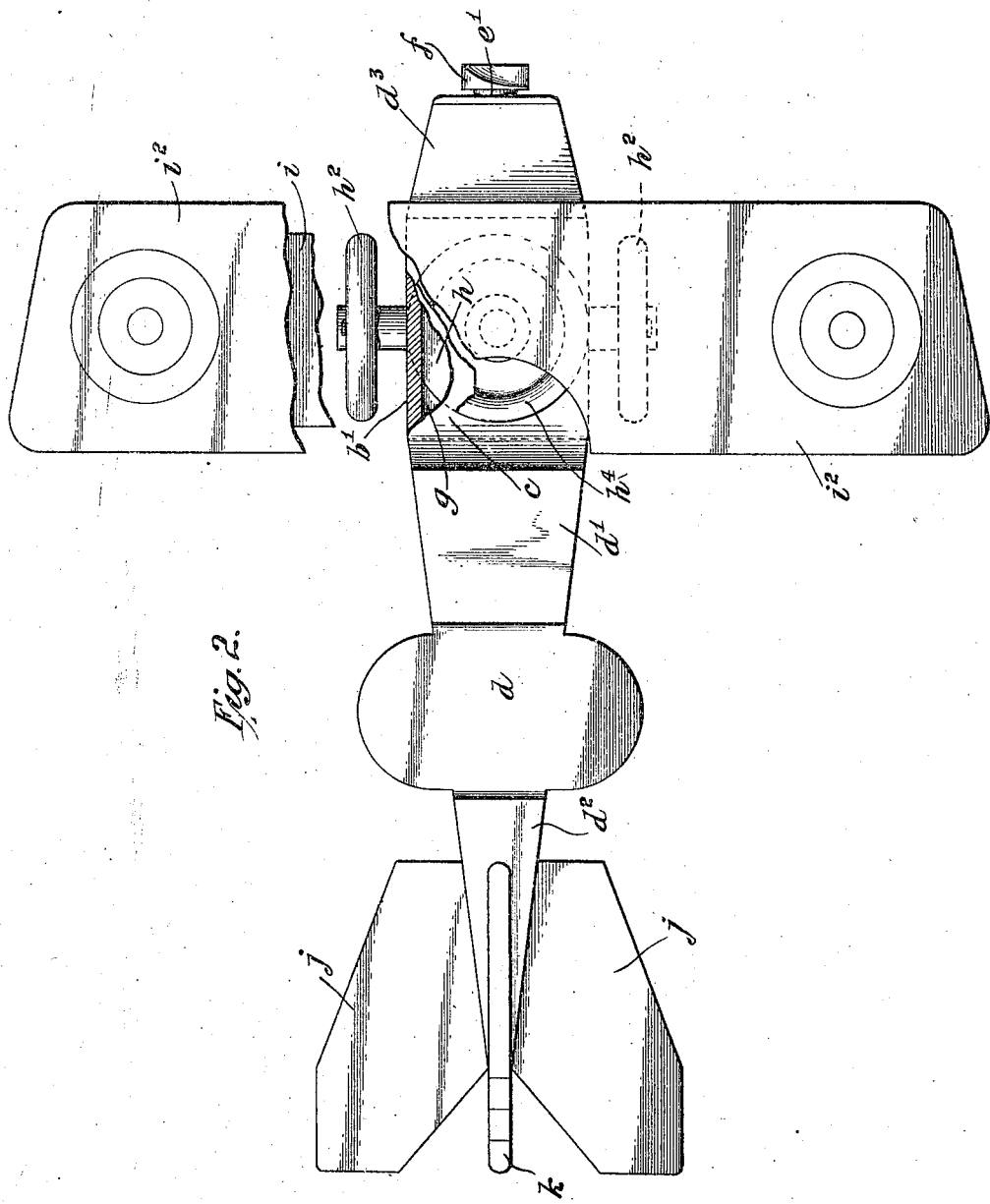

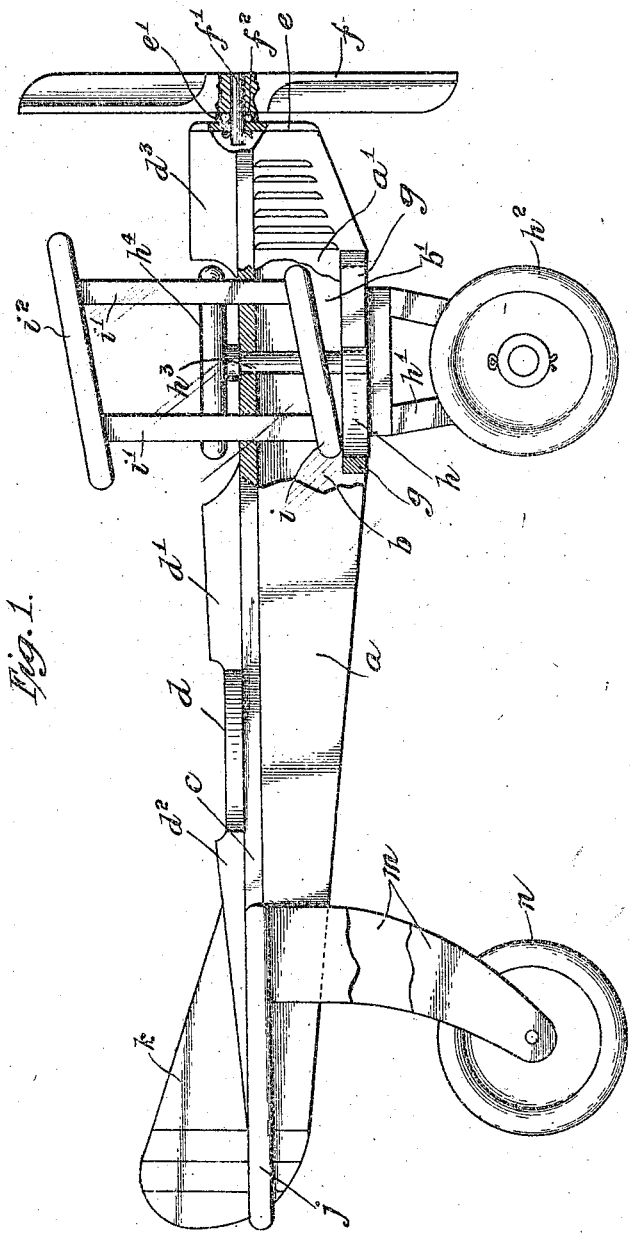

UNITED STATES PATENT OFFICE.

CHARLES STANLEY JACOB, OF ELIZABETH, NEW JERSEY.

VEHICLE.

1,297,856.        Specification of Letters Patent.      Patented Mar. 18, 1919.

Application filed December 30, 1918. Serial No. 268,900.

*To all whom it may concern:*

Be it known that I, CHARLES STANLEY JACOB, a citizen of the United States, residing at Elizabeth, in the county of Union and State of New Jersey, have invented certain new and useful Improvements in Vehicles, of which the following is a specification, reference being had therein to the accompanying drawings, which form a part thereof.

The invention relates to vehicles, and more particularly to a play vehicle of the type in which the user propels the vehicle by pushing it forward by means of the feet upon the ground.

The main object of the invention is to provide a vehicle of the character above referred to, which may be made as to the major part thereof, of planks so formed and assembled that the completed structure will in appearance resemble an ordinary airplane of the biplane, tractor type, the propeller being so mounted as to revolve with the progress of the vehicle. The wheels upon which the vehicle travels are so located as to give stability to the structure when it is traveling in a straight course, while causing the vehicle to have a tendency to tilt slightly when moving on a curve in either direction. The planes are located rearwardly of the propeller and immediately above a pair of steering wheels, the width of the vehicle at this point being such as to facilitate the mounting of these wheels, while permitting a steering wheel to be located between the planes in a position where it will be convenient to the user. The sides of the frame of the vehicle are so constructed as to impart the desired rigidity thereto, vanes being provided at the rear of this frame to simulate steering planes, the horizontal vanes being so assembled as to reinforce the brackets in which the single rear wheel is mounted.

The vehicle may be attractively colored and marked to increase the resemblance thereof to an actual airplane in the mind of a child of the age who would find such a plaything attractive.

The primary object is to produce a play vehicle of this character which may be made in large part of flat planks, thus permitting the inexpensive production of the article, without sacrificing its attractiveness or strength.

The invention consists in the novel features of construction and combination of parts hereinafter set forth and described, and more particularly pointed out in the claims hereto appended.

Referring to the drawings,

Figure 1 is a side elevation of a vehicle embodying my invention, portions thereof being broken away to disclose the structural characteristics thereof; and Fig. 2 is a plan view thereof.

Like letters refer to like parts in both of said views.

In the embodiment of my invention shown in the drawings, the body of the vehicle is composed of two side planks $a$ and $b$, which converge from a point toward the front of the vehicle to the back thereof, these planks being joined to two shorter planks $a'$ and $b'$ projecting forwardly thereof. The planks $a$ and $b$ are connected at the top thereof by a top plank $c$ having secured thereto a laterally extended seat $d$, the top plank $c$, forwardly and rearwardly of said seat, being provided with the ornamental blocks $d'$ and $d^2$, and at the forward end thereof with a block $d^3$, said blocks being so formed as to give the desired side contour to the body of the vehicle.

The front of the body is closed by a plate $e$ having a bearing opening therethrough adapted to receive the shaft $f'$ of a propeller $f$. The shaft $f'$ has a loose fit in the bearing of the plate $e$ to permit the propeller $f$ to turn freely as a result of the head resistance resulting from the movement of the vehicle. The shaft $f$ is held in said bearing in any desired manner, as by means of an ordinary cotter pin, the thrust of the propeller being against glass or metal ball bearings $f^2$ contained in a race formed by a ring $e'$ carried by the plate $e$ and the shaft $f'$.

The side planks $a$—$a'$ and $b$—$b'$ are recessed at the bottom thereof to receive a cross plank $g$ having a circular opening therein, the diameter of which is sufficiently great to open outwardly of said side planks and thus cause the edges of these planks to form a bearing for a wooden disk $h$, which is rotatably mounted in said circular opening and bears upon the edges of said side planks.

Carried by said disk $h$ is a bracket $h'$ having toward the bottom thereof, bearings for the shaft of the front wheels $h^2$ of the vehicle. Secured to said disk is a shaft $h^3$ having an upper bearing in the top plank c and carrying a steering wheel $h^4$ above said plank.

Secured to the side planks a—a' and b—b' respectively, and projecting laterally beyond the body of the vehicle, which body corresponds with the fuselage of an airplane, are vanes $i$ inclined as shown, supported from which, by means of the rungs $i'$, is an upper vane $i^2$ similarly pitched and having centrally thereof a recessed portion to permit access to the steering wheel $h^4$ which is positioned between the vanes $i$ and $i^2$.

Affixed to each side plank a and b, at the rear of the vehicle, are horizontal planks $j$ shaped substantially as shown, which simulate the elevating planes of an airplane, while the top plank c is provided with a shaped plank $k$, the rear curvature of which corresponds with the curvature of the end of the side planks a and b. This plank is secured to the top plank c.

Secured to the planks a and b and bearing upon the under side of the planks $j$, are oppositely disposed bracket members $m$ in which is mounted a single wheel $n$, which wheel is arranged intermediate the wheels $h^2$. The gage of the wheels $h^2$ is narrow so as to give a triangular support to the vehicle, thus imparting to it the desired stability when traveling upon a straight course, but causing it to have a tendency to tilt in making short curves in either direction.

The entire vehicle, excepting the steering wheel, may be made of flat stock and may be cheaply formed and assembled, while posessing sufficient strength to withstand the ordinary conditions of use. It may be so decorated as to convey, to the mind of youth, the desired impression.

The vehicle has no mechanisms which may become disarranged in use, the only moving parts being the propeller $f$, the steering head and the wheels. The narrow, hollow body formed by the planks a—a', b—b' and c, in order to secure the desired stream line effect, must have a laterally extended seat, like $d$, thereon, and the plank $i^2$ is arranged at a height which will permit the user to observe the propeller in motion and see objects in advance of the vehicle, while affording convenient access to the steering wheel $h^4$.

In use the child sits upon the seat $d$ and propels the vehicle by pushing upon the ground with the feet alternately, or with both feet, as desired, the movement of the vehicle resulting in the rotation of the propeller $f$, which preferably has only two blades.

It is not my intention to claim a play vehicle so constructed as to simulate an airplane, but those details of construction by which a vehicle having the desired appearance may be so constructed as to eliminate complicated mechanisms, while preserving the desired simplicity of construction and economy of production.

It is not my intention, however, to limit the invention to the precise design shown in the accompanying drawings, it being apparent that such may be varied without departing from the spirit and scope of the invention.

Having described the invention, what I claim as new and desire to have protected by Letters Patent, is:—

1. A vehicle embodying therein a body portion composed of rearwardly converging side planks, short side planks joined thereto and converging forwardly thereof, a top plank closing the space between said side planks, a laterally extended seat, a closure plate for the forward end of said body, a propeller having a shaft idly mounted in said plate, said side planks each having a recess in the bottom thereof, a cross plank having a circular opening therethrough seated in said recesses, a disk bearing upon said side planks and rotatably mounted in said opening, wheels carried by and movable with said disk, a single wheel mounted in fixed brackets adjacent the rear of said body, laterally extending lower vanes secured to opposite sides of said body above said cross plank, an upper vane extending parallel therewith and supported therefrom, a steering shaft carried by said disk, and terminated between said vanes, and a steering wheel carried thereby.

2. A vehicle embodying therein a body portion composed of rearwardly converging side planks, short side planks joined thereto and converging forwardly thereof, a top plank closing the space between said side planks, a laterally extended seat, a closure plate for the forward end of said body, a propeller having a shaft idly mounted in said plate, said side planks each having a recess in the bottom thereof, a cross plank having a circular opening therethrough seated in said recesses, a disk bearing upon said side planks and rotatably mounted in said opening, wheels carried by and movable with said disk, laterally extending lower vanes secured to opposite sides of said body above said cross plank, an upper vane extending parallel therewith and supported therefrom, a steering shaft carried by said disk and terminated between said vanes, a steering wheel carried thereby, horizontal planks affixed to said side planks rearwardly thereof, brackets fixedly secured to said side planks and abutting against said horizontal planks, and a single wheel mounted in said brackets.

3. A vehicle embodying therein a body portion composed of rearwardly converging side planks, short side planks joined thereto and converging forwardly thereof, a top plank closing the space between said side planks, a laterally extended seat, a closure plate for the forward end of said body, a propeller having a shaft idly mounted in said plate, said side planks each having a recess in the bottom thereof, a cross plank having a circular opening therethrough seated in said recesses, a disk bearing upon said side planks and rotatably mounted in said opening, wheels carried by and movable with said disk, laterally extending lower vanes secured to opposite sides of said body above said cross plank, an upper vane extending parallel therewith and supported therefrom, a steering shaft carried by said disk, and terminated between said vanes, a steering wheel carried thereby, horizontal planks affixed to said side planks rearwardly thereof, brackets fixedly secured to said side planks and abutting against said horizontal planks, a single wheel mounted in said brackets, and a vertically extending curved plank carried rearwardly of said seat, the lower edges of said side plank being curved to correspond with the curvature of said vertically extending plank.

In witness whereof I have hereunto affixed my signature this 23d day of December, 1918, in the presence of two subscribing witnesses.

CHARLES STANLEY JACOB.

Witnesses:
F. T. WENTWORTH,
CLARICE FRANCK.